United States Patent
Dias et al.

(10) Patent No.: US 8,871,868 B2
(45) Date of Patent: Oct. 28, 2014

(54) PROPYLENE IMPACT COPOLYMERS HAVING GOOD OPTICAL PROPERTIES

(71) Applicant: Braskem America, Inc., Philadelphia, PA (US)

(72) Inventors: Peter S. Dias, Pittsburgh, PA (US); Jonathan D. Kersey, College Station, TX (US); Peter S. Martin, Houston, TX (US); Thomas R. Cuthbert, Houston, TX (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 13/737,684

(22) Filed: Jan. 9, 2013

(65) Prior Publication Data

US 2014/0194577 A1    Jul. 10, 2014

(51) Int. Cl.
| | |
|---|---|
| *C08L 23/00* | (2006.01) |
| *C08F 8/00* | (2006.01) |
| *B29C 51/00* | (2006.01) |
| *B29C 45/00* | (2006.01) |
| *C08L 19/00* | (2006.01) |
| *C08L 23/14* | (2006.01) |

(52) U.S. Cl.
CPC .............. *C08L 23/14* (2013.01); *B29C 51/002* (2013.01); *B29C 45/0001* (2013.01); *C08L 19/00* (2013.01); *B29C 49/005* (2013.01)
USPC ............................. 525/191; 525/197; 525/240

(58) Field of Classification Search
USPC ......................................... 525/191, 197, 240
See application file for complete search history.

(56) References Cited

U.S. PATENT DOCUMENTS

| | | | |
|---|---|---|---|
| 6,930,149 B2 | 8/2005 | Haerkoenen et al. | |
| 7,250,471 B2 | 7/2007 | Stevens et al. | |
| 2012/0302701 A1 | 11/2012 | Martin et al. | |
| 2013/0005902 A1* | 1/2013 | Doshev et al. | 525/53 |

FOREIGN PATENT DOCUMENTS

| | | |
|---|---|---|
| EP | 1358266 B1 | 11/2007 |
| EP | 1702956 B1 | 8/2010 |

OTHER PUBLICATIONS

World Wide Web insert, taken Sep. 8, 2013, as evidence. http://en.wikipedia.org/wiki/Flexural_strength.*
Doshev, P., et al. "Fracture characteristics and deformation behavior of heterophasic ethylene-propylene copolymers as a function of the dispersed phase composition." *Polymer*, 2005, 46(22), 9411-9422.
Bensason, S., et al. "Classification of homogeneous ethylene-octene copolymers based on comonomer content." *J. Polym. Sci. B Polym. Phys.* 1996, 34, 1301-1015.
Di Martino, S., et al. "Determination of the Composition of Ethylene-Propylene Rubbers Using $^{13}$C-NMR Spectroscopy." *J. Applied Polymer Science*, 1995, 56, 1781-1787.

* cited by examiner

*Primary Examiner* — Nathan M Nutter
(74) *Attorney, Agent, or Firm* — K&L Gates LLP

(57) ABSTRACT

Propylene impact copolymers (ICPs) are provided which comprise: (a) a matrix phase which comprises from 60 to 95 weight % of a polypropylene polymer containing from 0 to 6 mole % of units derived from one or more alpha-olefins other than propylene, and (b) a dispersed phase which comprises from 5 to 40 weight % of a copolymer derived from a first comonomer which can be either propylene or ethylene together with a second alpha-olefin comonomer. The ICP is further characterized by having a beta/alpha ratio less than or equal to 1.1. The ICPs of the present invention are particularly well suited for applications requiring clear, tough polymers such as thin walled injection molded articles for frozen food packaging applications.

18 Claims, No Drawings

PROPYLENE IMPACT COPOLYMERS HAVING GOOD OPTICAL PROPERTIES

FIELD OF THE INVENTION

The present invention relates to new polypropylene impact copolymer ("ICP") compositions comprising a matrix phase and a dispersed phase. The compositions exhibit a combination of optical properties, such as improved resistance to blooming, improved transparency and decreased haze, together with excellent impact resistance and stiffness, particularly for applications such as thin walled injection molding. The compositions of the present invention have improved clarity, reduced blooming, and improved impact resistance and are therefore well suited for applications such as rigid packaging.

BACKGROUND

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To combat these issues, manufacturers have incorporated a dispersed copolymer phase (often called a "rubber" phase), which forms a dispersed phase within the polypropylene matrix. As used herein, the term "rubber" refers to the copolymer of the dispersed phase. These two-phase materials are referred to as impact copolymers or ICPs.

While impact resistance of ICPs is improved, a major drawback to such materials is the poor transparency, mostly due to the rubber particles being large enough to affect light transmission in the heterophasic system. Accordingly, several attempts have been made to improve the transparency of heterophasic polymer systems.

Some ICPs have been able to achieve clarity by blending in metallocene-catalyzed elastomers having the same refractive index as the matrix material. Other ICPs have sought to achieve clarity by increasing dispersed phase miscibility to achieve particles which are not large enough to affect the light transmission. While these approaches may produce clear materials, they generally lack the stiffness and/or toughness of a conventional ICP. It would be desirable to have an ICP which is clear, stiff and tough, and which is not based on either technique.

Other ICPs may lose clarity over time due to a process known as "blooming" where components in the dispersed rubber phase migrates to the surface of the polymeric article over time. Blooming manifests itself as increased haze in the polymeric article or as a whitish coating on the surface of the molded article. This haze can increase over time and the result is aesthetically undesirable and can lead to such issues as decreased shelf appeal in packaged goods.

ICPs can be formed by blending a rubber or dispersed phase with the matrix phase, but it is more preferred, from a cost-to-produce standpoint, that they are prepared using an in-reactor process, where the matrix and the dispersed phase are formed in separate reactors, typically operated in series. Thus, it would be desirable to have an in-reactor formed ICP which is clear, stiff, tough at very low temperatures, resistant to blooming, and which is not based on using rubber with increased miscibility with the matrix.

BRIEF SUMMARY

The present invention is directed to such polypropylene impact copolymer compositions which have improved clarity, reduced blooming, and improved impact resistance.

According to one embodiment, the present disclosure provides a composition comprising a matrix phase and a dispersed phase. The matrix phase comprises 50 to 95 weight % of a polypropylene polymer comprising from 0 to 6 mole % of units derived from one or more alpha-olefins selected from the group consisting of ethylene, 1-butene, 1-pentene, 1-hexene, 1-heptene, 1-octene, 1-nonene, 1-decene, 1-undecene, and 1-dodecene. The dispersed copolymer phase comprises from 5 to 50 weight % of the total polymer composition. The dispersed copolymer phase comprises from 40 to 90 weight % of a first copolymer comprising 35 to 85 weight % of ethylene and 15 to 65 weight % of a first rubber comonomer comprising one or more $C_3$-$C_{12}$ α-olefin, and from 10 to 60 weight % of a second copolymer comprising 65 to 95 weight % of ethylene and 5 to 35 weight % of a second rubber comonomer comprising one or more $C_3$-$C_{12}$ α-olefin, wherein the weight percent of ethylene in the second copolymer is greater than the weight percent of ethylene in the first copolymer.

In another embodiment, the present disclosure provides a fabricated article comprising a propylene impact copolymer composition. The propylene impact copolymer composition comprises a matrix phase and a dispersed phase. The matrix phase comprises 50 to 95 weight % of a polypropylene polymer comprising from 0 to 6 mole % of units derived from one or more alpha-olefins selected from the group consisting of ethylene, 1-butene, 1-pentene, 1-hexene, 1-heptene, 1-octene, 1-nonene, 1-decene, 1-undecene, and 1-dodecene. The dispersed copolymer phase comprises from 5 to 50 weight % of the total polymer composition. The dispersed copolymer phase comprises from 40 to 90 weight % of a first copolymer comprising 35 to 85 weight % of ethylene and 15 to 65 weight % of a first rubber comonomer comprising one or more $C_3$-$C_{12}$ α-olefin, and from 10 to 60 weight % of a second copolymer comprising 65 to 95 weight % of ethylene and 5 to 35 weight % of a second rubber comonomer comprising one or more $C_3$-$C_{12}$ α-olefin, wherein the weight percent of ethylene in the second copolymer is greater than the weight percent of ethylene in the first copolymer.

In still another embodiment, the present disclosure provides a fabricated article comprising a propylene impact copolymer composition having bloom resistance, a haze value less than about 25% on a 20 mil plaque as measured in accordance with ASTM D1003, a clarity value greater than about 95% on a 20 mil plaque as measured in accordance with ASTM D 1003, a drop impact resistance value greater than about 100 in-lbs at −40° C. as measured in accordance with ASTM D5420-10 (GE configuration), and a flexural modulus/stiffness value of greater than 110 kpsi as measured in accordance with ASTM D790 at 1% secant.

In another embodiment, the present disclosure provides a process for making a propylene impact copolymer composition comprising a matrix phase and a dispersed phase in a continuous sequential polymerization process. The process comprising polymerizing a matrix phase comprising a propylene polymer comprising from 0 to 6 mol % of units derived from monomers selected from the group consisting of ethylene, $C_4$-$C_{12}$ alpha-olefins and combinations thereof, polymerizing a first copolymer of the dispersed phase in the presence of the matrix phase, the first copolymer comprising an ethylene content of less than 85% by weight, and polymerizing a second copolymer of the dispersed phase in the presence of the matrix phase, the second copolymer comprising an ethylene content of greater than 65% by weight, wherein the ethylene content of the second copolymer is greater than the ethylene content of the first copolymer.

In a further embodiment, the present disclosure provides a process for making a propylene impact copolymer composition comprising a matrix phase and a dispersed phase in a sequential polymerization process. The process comprises polymerizing the matrix phase comprising 50 to 95 weight % of polypropylene polymer comprising from 0 to 6 mole % of units derived from one or more alpha-olefins selected from the group consisting of ethylene, 1-butene, 1-pentene, 1-hexene, 1-heptene, 1-octene, 1-nonene, 1-decene, 1-undecene, and 1-dodecene, polymerizing a first copolymer of the dispersed phase the first copolymer comprising from 40 to 90 weight % of the dispersed phase and comprising 35 to 85 weight % of ethylene and 15 to 65 weight % of a first rubber comonomer comprising one or more $C_3$-$C_{12}$ α-olefin, and polymerizing a second copolymer of the dispersed phase, the second copolymer comprising from 10 to 60 weight % of the dispersed phase and comprising 65 to 95 weight % of ethylene and 5 to 35 weight % of a second rubber comonomer comprising one or more $C_3$-$C_{12}$ α-olefin, wherein the weight percent of ethylene in the second copolymer is greater than the weight percent of ethylene in the first copolymer.

In still a further embodiment, the present disclosure provides for an article of manufacture made from any of the polymer compositions recited herein, wherein the article of manufacture is selected from the group consisting of a thin walled article, a thin walled injection molded article, and a thin walled injection molded article for frozen food packaging applications.

DETAILED DESCRIPTION

The following analytical methods and definitions are used in the present disclosure:

The term "polymer", as used herein, refers to a polymeric compound prepared by polymerizing monomers, whether of the same or a different type. The generic term polymer thus embraces the term "homopolymer", usually employed to refer to polymers prepared from only one type of monomer, "copolymer" which refers to polymers prepared from two or more different monomers, and blends of polymers which refers to compositions which comprise two or more polymers that have different polymeric structures.

"Polypropylene" shall mean polymers comprising greater than 50% by weight of units which have been derived from propylene monomer. This includes polypropylene homopolymers or copolymers (meaning units derived from two or more comonomers), as well as blends of polymers where polypropylene is the matrix phase of the blend.

The term "alpha-olefin" or "α-olefin" includes alkenes having a carbon-carbon double bond between the first and second carbon atom. Examples of alpha-olefins include, but are not limited to ethylene, propylene, 1-butene, 1-pentene, 1-hexene, 1-heptene, 1-octene, 1-nonene, 1-decene, 1-undecene, and 1-dodecene, including mixtures of any thereof.

Density is determined in accordance with ASTM D792.

"Melt flow rate" also referred to as "MFR" is determined according to ASTM D1238 (230° C., 2.16 kg).

"$E_m$" refers to the weight percent of comonomer (typically ethylene) in the matrix phase. $E_m$ can be determined during production using the mass-energy balance method as generally known in the art. $E_m$ can also be determined by isolating a sample of the matrix polymer and analyzing using Fourier transform infrared spectroscopy ("FTIR") as known the art. $E_m$ can also be estimated by analyzing the entire ICP using DSC melting point.

"$E_{tot}$" refers to total percent by weight comonomer (typically ethylene) in the propylene impact copolymer, and is measured by the method reported by S. Di Martino and M. Kelchtermans "Determination of the Composition of Ethylene-Propylene Rubbers Using $^{13}$C-NMR Spectroscopy" *J. of Applied Polymer Science*, 1995, 56, 1781-1787.

When used to describe the dispersed phase of the ICP composition, the terms "rubber", "elastomer" and "impact modifier" are used synonymously and refer to the dispersed copolymer phase and components thereof.

"$F_c$" refers to the percent by weight of the dispersed phase in the total impact copolymer. In general $F_c$ is equal to the ratio of amount of dispersed phase to the total amount of material made, which can readily be determined by mass balance or FTIR. FTIR is a preferred method when the matrix phase contains no comonomer. Alternatively, for certain impact copolymers containing no comonomer in the matrix, the dispersed phase content in the impact copolymer generally can be assessed by determining the amount of material which remains soluble in xylene at room temperature. However, in various impact copolymers, the dispersed phase may not be as soluble as it is in certain conventional ICP. For example, in the dispersed phase may be more crystalline and less soluble in xylene and therefore, this methods may not be as accurate as FTIR. Xylene Solubles ("XS") is measured according to the following procedure: 0.4 g of polymer is dissolved in 20 mL of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 mL/min. The column is coupled to a Viscotek Model 302 Triple Detector Array, with light scattering, viscometer and refractometer detectors operating at 45° C. Instrument calibration was maintained with Viscotek PolyCAL™ polystyrene standards. The amount of xylene solubles measured by this Viscotek method corresponds to the amount of dispersed rubber phase ($F_c$) in the impact copolymer. For impact copolymers containing comonomer in the matrix, the mass balance method is a more applicable method to determine F.

"$E_c$" refers to the ethylene content percent by weight in the dispersed phase and is calculated as $E_c=[E_{tot}-E_m(1-F_c)]/F_c$.

"Beta/alpha ratio" (also denoted as b/a or β/α) is conceptually the ratio of the dispersed phase (ethylene propylene rubber or "EPR") molecular weight to matrix phase molecular weight. It is normally measured as the intrinsic viscosity ("IV") of the dispersed phase divided by the IV of the homopolymer or random copolymer matrix. However on a practical level, as used in the production of impact copolymer polypropylene products, b/a defines the ratio of the melt flow of the homopolymer/random copolymer reactor product (typically Reactor No. 1) to that of the overall impact copolymer reactor product (typically Reactor No. 2), according to the following equation, with both melt flows measured on stabilized powder samples:

$$\beta/\alpha=[(MFR_1/MFR_2)^{0.213}-1]/(Fc/100)+1$$

where $MFR_1$ is the matrix phase only and $MFR_2$ is the overall ICP.

Refractive index (n) is measured in accordance with ASTM D 542. The term "|n1−n2|" is the absolute value of the difference between n1 and n2, and may also be denoted by the term "Δn." Values for Δn may be greater than 0.002, or from greater than 0.002 to 0.1. In this sense, Δn denotes a "refractive index mismatch" between the polymeric components of the composition.

In order to determine dispersed phase particle size and shape, Transmission Electron Microscopy ("TEM") may be used. The TEM method is as follows: Samples are prepared by injection molding to form 20 mil (15.75 g/sec fill rate, melt 240° C. and mold 38° C.) (60 mm×60 mm) plaques. The injection molded plaques are trimmed so that sections can be collected at the core in both parallel and perpendicular orientations. The trimmed samples are cryo-polished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 g of ruthenium(III) chloride hydrate ($RuCl_3.H_2O$) into a glass bottle with a screw lid and adding 10 mL of 5.25% aqueous sodium hypochlorite to the jar. The samples are placed in the glass jar using a glass slide having double sided tape. The slide is placed in the bottle in order to suspend the blocks about 2.54 cm above the staining solution. Sections of approximately 90 nanometers in thickness are collected at ambient temperature using a diamond knife on a Leica EM UC6 microtome and placed on 400 mesh virgin TEM grids for observation. Images are collected on a JEOL JEM-1230 operated at 100 kV accelerating voltage and collected on a Gatan-791 and 794 digital cameras. The images are post processed using Adobe Photoshop 7.0.

Size distribution analysis: Image analysis may be performed using Leica Qwin Pro V2.4 software from TEM images. The magnification selected for image analysis depends on the number and size of features to be analyzed. In order to allow for binary image generation of elastomer distributions, manual tracing of the elastomer domains from the TEM prints is carried out using a black Sharpie marker. The traced TEM images are scanned using a Hewlett Packard Scan Jet 4c and are imported into Adobe Photoshop 7.0. The images are enhanced by adjusting brightness and contrast to more clearly show the features of interest. The digital images are imported into a Leica Qwin Pro V2.4 image analysis program and converted to binary images by setting a gray-level threshold to include the features of interest. Once the binary images are generated, other processing tools are used to edit images prior to image analysis. Some of these features include removing edge features, accepting or excluding features and manually cutting features that require separation. Using image analysis of the TEM images, morphology of the ICP may be determined.

As used herein, the term "non-blooming" means the composition does not display significant migration of certain components of the dispersed phase to the surface of the polymeric article over time (i.e., "blooming"). Blooming may manifest itself as increased haze or decreased clarity in the polymeric article, for example, as measured by the haze value and/or clarity value using ASTM D1003. Blooming may also manifest itself as a whitish powder on the surface of the polymer. Blooming can be determined by the following equation: Blooming=$(haze_i - haze_f)$, where "$haze_i$" is the haze of an injection molded plaque immediately after injection molding and "$haze_f$" is the haze of that same plaque after storage at 50° C. for 7 days in a forced draft oven.

As used herein, the term "fabricated article" means any article of manufacture in which at least a portion of the article comprises the copolymer compositions described herein. Examples of fabricated articles include, but are not limited to articles comprising the copolymer compositions described herein where the copolymer composition has been thermoformed, injection molded, thin walled injection molded, formed as a flat plaque, or blow molded. Fabricated articles may include, but are not limited to, packaging materials, such as thin walled packaging materials, including blister packaging and packaging for frozen food applications or other cold temperature applications.

As used herein, the term "in-reactor" when used in reference to a polymer composition means a polymer composition which is polymerized without the need for post-polymerization blending (although the resultant copolymer can undergo poly-polymerization blending, for example, to incorporate modifiers, additives, or additional blend components). Each polymer component in the composition mixture may possess a unique molecular structure, such as percent comonomer content, composition distribution, molecular weight, molecular weight distribution, and/or molecular architecture, or combinations of any thereof. Although the various polymerization stages will normally be conducted in different polymerization zones, that is in different reactors or different parts of the same reactor, the stages may be conducted sequentially in the same polymerization zone.

ICPs of the Present Disclosure

The present disclosure is directed to compositions comprising high impact polypropylene polymers which display low haze values and/or high clarity values and are non-blooming. The present disclosure is also directed to fabricated articles which comprise a propylene high impact copolymer composition as described herein. In other embodiments, the present disclosure is directed to methods for forming a propylene impact copolymer composition.

As used in this specification and the appended claims, the singular forms "a", "and", and "the" include plural referents unless the context clearly dictates otherwise. Thus, for example, reference to "a polymer" includes more than one polymer.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Also, unless denoted otherwise, percentages of components in a composition are presented as weight percent.

It is to be understood that this invention is not limited to specific compositions, components or process steps disclosed herein, as such may vary. It is also to be understood that the terminology used herein is for the purpose of describing particular embodiments only, and is not intended to be limiting. Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

The propylene impact copolymers or ICPs of the present disclosure comprise at least two major component phases, the matrix phase and the dispersed copolymer phase. In certain embodiments, the matrix phase may comprise from 50 to 95 percent by weight of the ICP, in other embodiments from 60 to 95 percent by weight, or even from 70 to 95 by weight of the ICP. In certain embodiment, the dispersed copolymer phase may comprise from 5 to 50 percent by weight of the ICP and in other embodiments from about 5 to 40 percent by weight, or even from about 5 to 30 percent by weight of the ICP.

The matrix phase of the ICPs of the present invention may be derived from propylene monomers and optionally from about 0 to 6 mol percent of one or more alpha-olefins (including ethylene) other than propylene. According to these embodiments, the one or more alpha-olefin comonomer may be selected from the group consisting of ethylene, 1-butene, 1-pentene, 1-hexene, 1-heptene, 1-octene, 1-nonene, 1-decene, 1-undecene, and 1-dodecene. The matrix phase may comprise from 0, 0.1, 0.5, 1, or 1.5 mol percent comonomer to 6, 5.5, 5, 4.5, 4, 3.5, 3, 2.5, 2, 1.5, or 1 mol percent. (For purposes of the present disclosure when a series of upper and lower limits are given for ranges as in the preceding sentence, it is meant that any combination of a value identified as a lower range and a value identified as an upper range is expressly disclosed as a discreet range.) The matrix phase of the present compositions may comprise one or more individual polypropylene polymers (whether in-reactor or post reactor blends). While the optional alpha-olefin comonomer(s) can be ethylene or any $C_4$-$C_{12}$ alpha-olefin, in specific embodiments, the comonomer may be ethylene. In certain applications it is preferred that propylene homopolymer be used. In general, stiffness may be improved with less alpha-olefin comonomer, while impact resistance and optical properties may be improved with increasing alpha-olefin comonomer content. In applications where stiffness is critical, it may be preferred that the first polypropylene polymer comprise at least 99 mol percent of units derived from propylene. In specific non-limiting embodiments, the matrix phase may comprise about 97 to 98 percent by weight of propylene and from 2 to 3 mol percent of ethylene comonomers.

The second component of the ICPs according to the present disclosure is the dispersed copolymer phase. In certain embodiments, the dispersed copolymer phase may comprise from 5 to 50 percent by weight of the total ICP, that is, the Fc for the ICPs of the present invention will be from 5 to 50. In general, the dispersed copolymer phase will comprise at least 5, 10, 15, 20, or 25% by weight of the ICP, and in general, no more than 40, 35, 30, 25 or 20% by weight of the ICP. In specific embodiments the dispersed copolymer phase may comprise from about 5 to 40 percent by weight or even from about 5 to 30 percent by weight of the ICP. The dispersed copolymer phase of the present compositions may comprise one or more individual polymers (whether in-reactor or post reactor blends).

According to various embodiments, the dispersed copolymer phase comprises a blend of at least two copolymers, such as a first copolymer of ethylene and an alpha-olefin and a second copolymer of ethylene and an alpha-olefin. According to certain embodiments, the dispersed copolymer phase may comprise from 40 to 90 percent by weight of a first copolymer, in other embodiments from 50 to 80 percent by weight of a first copolymer, or even from about 60 to 70 percent by weight of a first copolymer; and the dispersed copolymer phase may comprise from 10 to 60 percent by weight of a second copolymer, in other embodiment from 20 to 50 percent by weight of a second copolymer, or even from about 30 to 40 percent by weight of a second copolymer. According to certain embodiments, the weight percent of ethylene in the second copolymer is greater than the weight percent of ethylene in the first copolymer. It is within the scope of the present disclosure for the dispersed copolymer phase to further comprise a third, fourth or even fifth copolymer of ethylene and an alpha-olefin.

According to various embodiments, the first copolymer of the dispersed copolymer phase may be a copolymer comprising ethylene and a first rubber comonomer comprising one or more $C_3$-$C_{12}$ alpha-olefin. For example, according to certain embodiments, the first copolymer may comprise from 35 to 85 percent by weight of ethylene, in other embodiments from 50 to 70 percent by weight, or even from 60 to 65 percent by weight of ethylene. According to certain embodiments, the first rubber comonomer may comprise from 15 to 65 percent by weight of the one or more $C_3$-$C_{12}$ alpha-olefin, in other embodiments from 30 to 50 percent by weight, or even from 35 to 40 percent by weight of the one or more $C_3$-$C_{12}$ alpha-olefin. In various embodiments, the first rubber comonomer may comprise one or more $C_3$-$C_8$ alpha-olefin, for example in certain embodiments one or more of 1-octene, 1-hexene, 1-butene, and propylene, and in specific embodiments, the first rubber comonomer may comprise propylene.

According to various embodiments, the second copolymer of the dispersed copolymer phase may be a copolymer comprising ethylene and a second rubber comonomer comprising one or more $C_3$-$C_{12}$ alpha-olefin. For example, according to certain embodiments, the first copolymer may comprise from 65 to 95 percent by weight of ethylene, in other embodiments from 75 to 95 percent by weight, or even from 85 to 95 percent by weight of ethylene. According to certain embodiments, the second rubber comonomer may comprise from 5 to 35 percent by weight of the one or more $C_3$-$C_{12}$ alpha-olefin, in other embodiments from 5 to 25 percent by weight, or even from 5 to 15 percent by weight of the one or more $C_3$-$C_{12}$ alpha-olefin. In various embodiments, the second rubber comonomer may comprise one or more $C_3$-$C_8$ alpha-olefin, for example in certain embodiments one or more of 1-octene, 1-hexene, 1-butene, and propylene, and in specific embodiments, the second rubber comonomer may comprise propylene. In various embodiments, at least one of the first rubber comonomer and the second rubber comonomer may comprise propylene and in specific embodiments each of the first rubber comonomer and the second rubber comonomer may comprise propylene.

One consequence of having a high fraction of high MFR rubber with an ethylene content of greater than 30 percent by weight in the dispersed phase, which is necessary for toughness (for example, as measured by impact strength) and clarity, is surface bloom. Without intending to be limited, it is believed that very low molecular weight amorphous rubber (i.e., less than entanglement weight), for example, ethylene, migrates to the surface over time, which manifests itself in increased haze (i.e., blooming) One approach to mitigate the increased blooming is to incorporate crystallinity into the rubber dispersed phase, i.e., by incorporating high propylene (>80 percent by weight) or high ethylene (>80 percent by weight) to, in effect, anchor the migrating species. However, using such rubbers, which are characterized by significantly higher glass transition temperatures, in the dispersed phase may cause issues such as substantially reduced low temperature impact resistance.

An alternate approach to limit blooming is to reduce the content of the high MFR rubber by substituting a portion of it with matrix polymer. However, this has an effect of significantly decreasing the impact toughness at temperatures, such as −20° C. and −40° C. because of the reduced rubber (dispersed phase) content. Similarly, replacing a portion of the high MFR rubber with a high ethylene content refractive-index matching rubber would be expected to reduce blooming but also to reduce the impact toughness and increase brittleness at −20° C. and −40° C. For example, even at very high loadings, up to 30 percent by weight, it has been shown that polypropylene compositions with high ethylene content refractive-index matching rubber display undesired brittleness at −20° C. and −40° C.

In contrast to these considerations, the ICP compositions of the present disclosure surprisingly not only have anti-blooming qualities but also display impact resistance at temperatures down to −40° C. For example, the applicants have discovered that the polypropylene matrix composition comprising a dispersed phase of a blend of a first copolymer comprising ethylene and a first rubber comonomer and a second copolymer comprising ethylene and a second rubber comonomer displays anti-blooming qualities while maintaining the desired impact resistance at temperatures of −20° C. and −40° C.

According to various embodiments, the ICP compositions of the present disclosure may be further characterized by having a beta/alpha ratio less than or equal to 1.1, and in certain embodiments, less than or equal to 1.05, or even less than or equal to 1.0.

In certain embodiments, the compositions of the present disclosure may comprise a first copolymer and a second copolymer in the dispersed copolymer phase comprising amounts of ethylene, such as disclosed herein, such that the ICP composition is non-blooming Non-blooming may be measured by migration of polymer to the surface of the polymeric article resulting in haze and/or reduction of clarity. For example, according to certain embodiments, blooming may comprise an increase in the haze value for the polymeric composition of greater than 10% or even an increase of 5%. In other embodiments, blooming may comprise a decrease in clarity of greater than 10% or even greater than 5%. According to certain embodiments, the present disclosure provides for a polymeric ICP composition wherein the composition has a haze value of less than 30%, including less than about 25% or even less than about 20%, 15%, 10%, 9%, 8% or even 7%. The haze value of the ICP composition may be measured according to industry standards, for example, in one embodiment the haze value of the ICP composition may be measured using a 20 mil (508 micron) plaque in accordance with ASTM D1003. In other embodiments, the present disclosure provides for a polymeric ICP composition wherein the composition has a clarity value of greater than about 95% or even greater than about 97%. The clarity value of the ICP composition may be measured according to industry standards, for example, in one embodiment the clarity value of the ICP composition may be measured using a 20 mil (508 micron) plaque in accordance with ASTM D1003.

It is generally preferred that the dispersed phase comprise propylene/ethylene copolymers. The above ranges generally define a range where the resulting dispersed phase will not have a refractive index within 0.002 of the refractive index for the matrix phase.

While the ICP compositions of the present disclosure may be produced by melt compounding the individual polymer components, according to various embodiments they may be made using an in-reactor process. In certain embodiments, this may be accomplished by polymerizing the monomer(s) (propylene, for example) to be used as the matrix phase in a first reactor in the presence of a polymerization catalyst and transferring the resulting polymer from the first reactor into a second reactor where the monomers comprising the dispersed phase are polymerized in the presence of the matrix phase. Alternatively, the polymer from the first reactor may be sequentially transferred to a second and third reactor where monomers for synthesizing the first copolymer and the second copolymer, respectively, may be polymerized to form the dispersed phase. It should be understood that "first," "second" and "third" reactor are used to designate whether the reactor produces the matrix phase (generally referred to as reactor 1) or the dispersed phase (generally referred to as reactor 2 and optionally reactor 3) but that each "reactor" may each comprise more than one physical reactor and be situated in any order. Such "reactor-grade" products, theoretically can be interpolymerized or blended in one reactor, but are more preferably formed using two reactors in series. In certain embodiments, the impact copolymers of this invention may conveniently be prepared by conventional (for impact copolymers) polymerization processes, such as a two-step process, although it is conceivable that they may be produced in a single reactor. Each step may be independently carried out in a gas phase reactor, fluidized bed reactors, or other particle forming process or reactor. For example, the first step may be conducted in a gas phase reactor or other particle forming process. In specific embodiments, the dispersed phase is polymerized in a second, gas phase reactor. According to various embodiments, the polymeric compositions described herein may be an in-reactor composition.

In an alternative embodiment, the polymer material used for the matrix is made in at least two reactors in order to obtain fractions with varying melt flow rate and/or varying comonomer content. This has been found to improve the processability and some physical properties of the impact copolymers.

In specific embodiments, the ICP compositions of the present disclosure may be produced using a polymerization catalyst, such as, for example, a Ziegler Natta polymerization catalyst such as a non-metallocene Ziegler Natta catalyst, a homo- or heterogeneous Ziegler Natta catalyst, or a supported Ziegler Natta catalyst and including, for example any necessary co-catalyst. According to certain embodiments, the polymerization catalyst may be the same catalyst throughout the polymerization process. That is, the polymerization catalyst may be transferred from the first reactor to the second reactor (and/or subsequent reactors) along with the polymeric material formed in the reactor. Suitable catalysts include commercially available and non-commercially available Ziegler Natta ("ZN") catalysts, such as ZN catalysts suitable for use in SPHERIPOL® type polymerization processes, UNIPOL™ type polymerization processes, NOVOLEN® type polymerization processes, INNOVENE® type polymerization processes, Chisso type polymerization processes, and Spherizone type processes. Such catalyst may include but are not limited to SHAC™ catalyst systems (commercially available from Dow Chemicals, Midland, Mich.), UCAT™ catalysts systems (commercially available from Univation Technologies, Houston, Tex.), LYNX®, CD® and PTK® catalyst systems (commercially available from BASF, Ludwigshafen, Germany), and other third and higher generation ZN catalysts.

As is generally known in the art, hydrogen may be added to any of the reactors to control molecular weight, intrinsic viscosity and melt flow rate (MFR) of the polymeric composition within the reactor. In certain embodiments, the composition of the dispersed rubber phase may be controlled (typically in the second reactor) by the ratio of the alpha-olefin comonomers and the amount of hydrogen. According to certain embodiments, the overall melt flow rate of the ICP polymer composition may be greater than or equal to 2 g/10 min. In other embodiments, the overall melt flow rate of the ICP polymer composition may be between 2 g/10 min and 100 g/10 min, and in other embodiments between 2 g/10 min and 75 g/10 min.

The final impact copolymer compositions as obtained from the reactor or reactors may be blended with various other components including other polymers. A variety of additives may be incorporated into the impact copolymer for various purposes. Such additives include, for example, stabilizers, antioxidants (for example hindered phenols such as Irganox™ 1010 from the BASF Corporation), phosphites (for example Irgafos™ 168 from the BASF Corporation), cling additives (for example polyisobutylene), polymeric processing aids (such as Dynamar™5911 from 3M Corporation or Silquest™ PA-1 from Momentive Performance Materials), fillers, colorants, clarifiers (for example, Millad 3988i and Millad NX8000 from Milliken & Co.); antiblock agents, acid scavengers, waxes, antimicrobials, UV stabilizers, nucleating agents (for example NA-11 from Amfine Corporation), optical brighteners and antistat agents.

The ICPs of the present disclosure may be cracked using peroxides or other agents in order to increase the MFR, as is generally known in the art. In certain embodiments, the in-reactor ICPs of the present disclosure may have a melt flow rate of at least 2 g/10 min, in other embodiments at least 4 g/10 min, or even a MFR of 8 g/10 min, and in certain embodiments at least 20 g/10 min, or even 25 g/10 min prior to subjecting the ICPs to any cracking process. The cracked ICPs may have an MFR greater than 25, 30, 40, 50, 60, 70, 80, 90, or 100 g/10 min.

In specific embodiments, the present disclosure provides processes for making a propylene impact copolymer composition comprising a matrix phase and a dispersed phase in a sequential polymerization process. In certain embodiments, the process for making a propylene impact copolymer composition may include a continuous sequential polymerization process comprising polymerizing a matrix phase and polymerizing a first copolymer of the dispersed phase in the presence of the matrix phase and polymerizing a second copolymer of the dispersed phase in the presence of the matrix phase. According to certain embodiments, the matrix phase may comprise a propylene polymer having from 0 to 6 mol % of units derived from monomers selected from ethylene, $C_4$-$C_{12}$ alpha olefins and combinations of any thereof, the first copolymer of the dispersed phase may comprise an ethylene content of less than 85% by weight, and the second copolymer of the dispersed phase may comprise an ethylene content of greater than 65% by weight, wherein the ethylene content of the second copolymer is greater than the ethylene content of the first copolymer of the dispersed phase. Other embodiments of the present disclosure provide for propylene impact copolymer compositions produced by the process described above.

In other embodiments, the process may comprise the steps of a) polymerizing a matrix phase comprising 50% to 95% by weight of polypropylene polymer comprising from 0 to 6 mole percent of units derived from one or more alpha-olefins selected from the group consisting of ethylene, 1-butene, 1-pentene, 1-hexene, 1-heptene, 1-octene, 1-nonene, 1-decene, 1-undecene, and 1-dodecene; b) polymerizing a first copolymer of the dispersed phase, wherein the first copolymer may comprise from 40% to 90% by weight of the dispersed phase and wherein the first copolymer comprises 35% to 85% by weight of ethylene and 15% to 65% by weight of a first rubber comonomer comprising one or more $C_3$-$C_{12}$ alpha-olefin; and c) polymerizing a second copolymer of the dispersed phase, wherein the second copolymer may comprise from 10% to 60% by weight of the dispersed phase and wherein the second copolymer comprises 65% to 95% by weight of ethylene and 5% to 35% by weight of a second rubber comonomer comprising one or more $C_3$-$C_{12}$ alpha-olefin, wherein the weight percent of ethylene in the second copolymer is greater than the weight percent of ethylene in the first copolymer. Other embodiments of the present disclosure provide for propylene impact copolymer compositions produced by the process described above.

The sequential steps of the process may be performed in any order. For example, in certain embodiments, the matrix phase may be polymerized first, for example in a first reactor, the first copolymer of the dispersed phase may be polymerized in the presence of the matrix phase, for example in a second reactor, to form a blend of the matrix phase and the first copolymer of the dispersed phase. The second copolymer of the dispersed phase may then be polymerized in the presence of the blend of the matrix phase and the first copolymer of the dispersed phase, which may also be done in the second reactor or alternatively in a third reactor. Alternatively in other embodiments, the matrix phase may be polymerized first, for example in a first reactor, the second copolymer of the dispersed phase may be polymerized in the presence of the matrix phase, for example in a second reactor, to form a blend of the matrix phase and the second copolymer of the dispersed phase. The first copolymer of the dispersed phase may then be polymerized in the presence of the blend of the matrix phase and the second copolymer of the dispersed phase, which may also be done in the second reactor or alternatively in a third reactor. In even other embodiments, the first and second copolymers of the dispersed phase may be polymerized either separately or together to form the dispersed phase as a blend of the first and second copolymers, for example in a first reactor, and then the matrix phase may be polymerized in the presence of the blend of the first and second copolymers of the dispersed phase, for example in a second reactor.

In still further embodiments, the process may further comprise melting the resulting blend of the matrix phase and dispersed phase and then pelletizing the resulting propylene impact copolymer composition. For example, in certain embodiments, the process may form a polymer sphere having different layers according to the order that the polymeric materials are combined. The resulting spheres may then be melted and pelletized to form pellets of the blended ICP composition. The ICP composition may be used form an article of manufacture. For example, in certain embodiments, the processes of the present disclosure may further comprise fabricating at least a portion of an article of manufacture from the propylene impact copolymer composition. The fabricating at least a portion of an article of manufacture may comprise any known polypropylene fabricating step. For example, in certain embodiments, the fabricating at least a portion of an article of manufacture may comprise a fabricating step selected from the group consisting of injection molding, thin-wall injection molding, thermoforming and blow molding.

As recited herein, according to various embodiments of the processes to make a polypropylene impact copolymer composition comprising a matrix phase and a dispersed phase in a sequential polymerization process, at least one of the matrix phase, the first copolymer of the dispersed phase, the second polymer of the dispersed phase may be polymerized in a gas phase reactor or other particle forming reactor. For example, according to one embodiment, the matrix phase may be polymerized in a first gas phase reactor or other particle forming reactor, and then transferred to a second gas phase reactor or other particle forming reactor where the first copolymer of the dispersed phase is polymerized in the presence of the matrix phase. The second copolymer of the dispersed phase may then be added to the second reactor after polymerization of the first copolymer, or alternatively, the blend of the matrix phase and the first copolymer of the dispersed phase may be transferred to a third gas phase reactor where the second copolymer of the dispersed phase may be polymerized in the presence of the matrix phase and the first copolymer of the dispersed phase. It will be understood that the order of the polymerizations may be in any order such that the resulting ICP polymer is produced. For example, in one embodiment, the matrix phase may be polymerized followed by polymerizing the second copolymer of the dispersed phase and then the first copolymer of the dispersed phase. In another embodiment, the first copolymer of the dispersed phase may be polymerized, followed by polymerizing the matrix phase and then the second copolymer of the dispersed phase, or alternatively, followed by polymerizing the second copolymer of the dispersed phase followed by polymerizing the matrix phase. Likewise, in another embodiment, the second copolymer of the dispersed phase may be polymerized first, followed by the matrix phase and then the first copolymer of the dispersed phase, or alternatively followed by polymerizing the first copolymer of the dispersed phase and then polymerizing the matrix phase.

As discussed herein, the first, second and any subsequent reactors (if present) may be a gas phase reactor or other particle forming reactor. The reactors may be connected in series, such that the polymeric material in the first reactor is transferred to the second reactor, and optionally to a third reactor, in sequence. According to certain embodiments, the first, second and subsequent reactors (if present) may be gas phase reactors. For example, in various embodiments, the first gas phase reactor and a second gas phase reactor (and optionally any subsequent reactor) may be connected in series.

The various embodiments of the process for forming the ICP polypropylene polymer composition may result in a polymer composition having an overall melt flow rate of from 2 g/10 min and 75 g/10 min. The MFR of the composition may be dependent on the intended use of the ICP polymer. For example, in embodiments where the polymer composition will be used in an injection molding process, the polymer composition may have an overall MFR of from 15 g/10 min to 75 g/10 min. In embodiments where the polymer composition will be used in a thermoforming process, the polymer composition may have an overall MFR of from 2 g/10 min to 5 g/10 min.

The ICPs of the present disclosure are well suited for use in thin-walled molding applications. During such processes, flow forces and/or shear forces stretch or otherwise strain the molten elastomer particles as the polymeric blend moves through the mold die. The forces during molding strain the elastomer particles to an entropically disfavored state. In this strained state, the elastomer particles may exhibit an elongated and/or rod-shaped morphology. The process further includes crystallizing the matrix phase before the elongated particles of elastomer return to an un-stretched, non-elongated, or otherwise thermodynamically favorable state. In other words, the matrix phase is crystallized before the elongated elastomer particles cool, thereby immobilizing or otherwise freezing the elongated elastomeric particles in their entropically disfavored state. In an embodiment, the process may include cooling the molded article and preventing strain recovery of the elongated elastomer particles.

An "elongated elastomer particle," as used herein, is an elastomer present in a molded article as a discontinuous phase dispersed within a continuous phase, the elongated elastomer particle having an average length of the longer (or "major") axis at least 5 times, alternatively 10 times, the average length of the shorter (or "minor") axis from a sectional view taken along an axis extending through the mold flowpath. The "flowpath" or "mold flowpath" is the direction of travel of the plastic polymeric blend through the mold. The length and width of the elongated elastomer particle may be determined by way of transmission electron microscopy (TEM). The elongated elastomer particles are parallel to, or substantially parallel to, the flowpath. The elongated elastomer particles advantageously do not interfere with the transmission of the light traveling (i.e., do not scatter light) through the article thereby improving clarity and reducing haze of the molded article. Therefore, in certain embodiments, the elastomer particles may have an average length of the minor axis of less than 150 nanometers.

The ICP compositions of the present disclosure are characterized by their toughness as measured by impact resistance particularly at low temperatures, such as, for example –40° C. or even –20° C. In certain embodiments, the ICP compositions may have an impact resistance, as measured by ASTM D5420-10 GE configuration (commonly referred to as Gardner) at –40° C., of greater than or equal to 100 inch-pounds, in particular embodiments, greater than or equal to 150 inch-pounds, greater than or equal to 175 inch-pounds or even greater than or equal to 200 inch-pounds.

The ICPs of the present invention are also characterized by their stiffness as evidenced by modulus, as determined by ASTM D790A. In certain embodiments, the ICPs of the present invention have a modulus of at least 120, 135, or even at least 150 kpsi.

The ICPs of the present invention are also characterized by their optical properties, and in particular haze. Haze is determined by ASTM D1003, 20 mil (508 micron) plaque. According to certain embodiments, the ICPs of the present invention have a haze below 30%, and in other embodiments less than 25%, 20%, 15%, 10%, 9%, 8% or even 7%.

The properties of the inventive compounds make them particularly well suited for thin walled articles, thin walled injection molded articles, particularly thin walled injection molded articles for frozen food packaging applications. Thus, the present disclosure also provides for articles of manufacture made from the various embodiments of the composition described herein, wherein the article may be selected from the group consisting of a thin walled article, a thin walled injection molded article, and a thin walled injection molded article suitable for use in frozen food packaging applications.

In other embodiments, the present disclosure provides a fabricated article comprising a propylene impact copolymer composition, such as a propylene impact copolymer composition according to any of the embodiments described herein. For example, the fabricated article may comprise a propylene impact copolymer composition that is resistant to blooming while maintaining acceptable toughness, as described herein. According to one embodiment, the fabricated article may comprise a polypropylene impact copolymer composition comprising a matrix phase comprising 50% to 95% by weight of a polypropylene polymer comprising from 0 to 6 mole percent of units derived from one or more of ethylene, 1-butene, 1-pentene, 1-hexene, 1-heptene, 1-octene, 1-nonene, 1-decene, 1-undecene, and 1-dodecene and a dispersed copolymer phase comprising from 5% to 50% by weight of the total composition. The dispersed copolymer phase may comprise from 40% to 90% by weight of a first copolymer comprising 35% to 85% by weight of ethylene and 15% to 65% by weight of a first rubber comonomer comprising one or more $C_3$-$C_{12}$ alpha-olefin and from 10% to 60% by weight of a second copolymer comprising 65% to 95% by weight of ethylene and 5% to 35% by weight of a second rubber comonomer comprising one or more $C_3$-$C_{12}$ alpha-olefin, wherein the weight percent of ethylene in the second copolymer in the dispersed phase is greater than the weight percent of ethylene in the first copolymer in the dispersed phase. In certain embodiments, at least one of the first rubber comonomer and the second rubber comonomer is propylene.

In specific embodiments of the fabricated article, the propylene impact copolymer composition may have a beta/alpha ratio of less than or equal to about 1.1, and in certain embodiments, less than or equal to 1.05, or even less than or equal to 1.0. In particular embodiments, the first copolymer and/or the second copolymer contain amounts of ethylene such that the composition is non-blooming. For example in one embodiment, the ICP polymer contained in the fabricated article may have a haze value of less than about 25%, when measured on a 20 mil plaque in accordance with ASTM D1003. Alternatively, the ICP polymer contained within the fabricated article may have a clarity value of greater than about 95% as measured on a 20 mil plaque in accordance with ASTM D1003.

In addition, in certain embodiments the ICP composition in the fabricated article may have a Gardner impact value as measured by ASTM D5420 at −40° C., of greater than or equal to 100 inch-pounds, in particular embodiments, greater than or equal to 150 inch-pounds, 175 or even 200 inch-pounds. In various embodiments, the ICP composition in the fabricated article may have a flexural modulus/stiffness value of greater than or equal to 110 kpsi, as measured in accordance with ASTM D790 at 1% secant.

According to other embodiments, the present disclosure provides a fabricated article comprising a propylene impact copolymer composition having bloom resistance, a haze value of less than about 25% on a 20 mil plaque as measured in accordance with ASTM D1003, a clarity value of greater than about 95% on a 20 mil plaque as measured in accordance with ASTM D1003, a drop impact resistance value greater than about 100 in-lbs at −40° C. as measured in accordance with ASTM D2463, and a flexural modulus/stiffness value of greater than 100 kpsi as measured in accordance with ASTM D790 at 1% secant.

According to various embodiments, the fabricated articles, such as containers formed from the ICP polypropylene compositions of the present disclosure may be tested for under the following where it may be conditioned according to ASTM D4332 at −40° C. and tested under drop test for loaded containers according to ASTM D5276 where the container is dropped according to the standard and displays a mean failure height of greater than 36 inches with a fill weight of 420 g. In other embodiments, the container may display a mean failure height of greater than 50 inches, greater than 65 inches or even greater than 67 inches. In certain embodiments, the container may display a mean failure height of greater than 100 inches, in other embodiments greater than 150 inches, or even greater than 200 inches. According to other embodiments, the container may display a mean failure height of less than 350 inches, and in other embodiments of less than 325 inches or even 300 inches.

According to the various embodiments of the fabricated articles described herein, the fabricated article may be an article selected from the group consisting of a thermoformed article, an injection molded article, a thin-walled injection molded article, a flat plaque, and a blow molded article. It will be understood that the fabricated article may comprise several ICP polymeric portions where each of the ICP polymeric portions may be made by a process selected from the group consisting of thermoforming, injection molding, thin-walled injection molding, flat plaque forming, and blow molding, such that different portions of the fabricated article are made using different molding/forming processes.

These and other features of the various embodiments of the present disclosure will become more apparent upon consideration of the following examples. The various embodiments of this disclosure described in the following examples are not to be considered as limiting the invention to their details. All parts and percentages in the examples, as well as throughout this specification, are by weight unless otherwise indicated.

EXAMPLES

Test Methods

Gardner impact resistance was determined in accordance with ASTM D5420-10GE. Impact testing was performed according to ASTM D5420-10, The Standard Test Method for Impact Resistance of Flat, Rigid Plastic Specimen by Means of a Striker Impacted by a Falling Weight (Gardner Impact) GE configuration. The testing was performed using a Gardner IM-5547 Automatic Lift Impact Tester (Paul Gardner Company, Pompano Beach, Fla.). Configuration of the apparatus was 'standard ring-in'. The falling weight, or hammer, weighed 8 lbs for all testing. In order to determine the mean failure energy, the drop height of the hammer was varied according to the Bruceton Staircase or up and down method. Specimens were conditioned for 6 hours prior to testing. The conditioning freezers were set to −40° C. Disks (3.25 inch in diameter) were removed from their respective freezers immediately before testing, with approximately 20 seconds elapsing between the time of removal and the moment of impact.

Blooming was determined by the increase in 20 mil plaque haze following aging at 50° C. in a Forced Draft Oven ("FDO") for 7 days.

Flexural Modulus (1% Secant) was determined in accordance with ASTM D790A Method I, using an ASTM D638 Type 1 specimen tested at 1.3 mm/min.

Haze was measured in accordance with ASTM D1003 on 20 mil injection molded (15.75 g/sec fill rate, melt 240° C. and mold 38° C.) (60×60 mm) plaques.

Procedure

Polymer Generation

Examples 1-8 were generated in a fluidized bed reactor system. A typical fluidized bed reactor system to make the impact copolymers of the present disclosure can be described as follows:

The reactor system used to generate impact copolymer (ICP) is comprised of two fluidized bed reactors linked in series. Catalyst was fed into the first reactor to make polymer as the matrix material in an ICP. This resin from the first reactor was transferred to the second reactor for continued polymerization to intimately incorporate the rubber component (dispersed phase) of the ICP within the matrix. Reactor gas from the second reactor was typically used to transfer resin from the product discharge system of the first reactor to the fluidized bed of the second reactor via the inter reactor transfer system.

The linked reactors, however, each function independently as a fluidized bed reactor as discussed in greater detail below:

The bed was typically made up of the same granular resin that is to be produced in the reactor. Thus, during the course of the polymerization, the bed comprised formed polymer particles, growing polymer particles, and catalyst particles fluidized by polymerizable and modifying gaseous components introduced at a flow rate or velocity sufficient to cause the particles to separate and act as a fluid. The fluidizing gas was made up of the initial feed, make-up feed, and cycle (recycle) gas, i.e., monomers and, if desired, modifiers and/or an inert carrier gas.

The various parts of the reaction system include the vessel, the bed, the gas distribution plate, inlet and outlet piping, a compressor, a cycle gas cooler, and a product discharge system. In the vessel, above the bed, there was a velocity reduction zone, and in the bed, a reaction zone. Both are above the gas distribution plate.

The fluidized bed reactors are operated at a temperature in the range of about 40° C. to about 150° C. and even about 60° C. to about 120° C. and a pressure of about 50 psig to about 700 psig or in certain embodiments about 250 psig to about 550 psig. The velocity of the fluidizing gas is in the range of about 0.1 to about 3.0 feet per second and in certain embodiments about 0.5 to about 2.0 feet per second. The weight flow ratio of monomer(s) to catalyst in the first reactor is about 1,000:1 to about 100,000:1 and in certain embodiments is about 10,000:1 to about 100,000:1.

Propylene or a mixture of propylene and at least one alpha-olefin having 2 to 12 carbon atoms is introduced together with hydrogen and catalyst into the first reactor. The alpha-olefin components can be, for example, ethylene, 1-butene, or 1-hexene, or various mixtures of alpha-olefin. The combination of components and conditions, previously mentioned, lead to a mixture of homopolymer or copolymer of propylene together with active catalyst embedded in the polymer matrix. Polymerization was done using triethyl aluminum (TEAl) as the co-catalyst.

To illustrate, the specific conditions of the fluid bed reactor system for Examples 1, 2 and 3 are given in Table 1 below:

TABLE 1

| | | units | Example 1 | Example 2 | Example 3 |
|---|---|---|---|---|---|
| | Catalyst Type | | SHAC ™ 320 | SHAC ™ 320 | SHAC ™ 320 |
| Rx1 | Melt Flow | (g/10 min) | 17.4 | 22.2 | 7.0 |
| | XS-Wet | (wt %) | 2.02 | 2.40 | 2.36 |
| | Rx1 Et | (wt %) | 0.0 | 0.0 | 0.0 |
| Rx2 | Melt Flow | (g/10 min) | 25.4 | 24.52 | 8.0 |
| | Fc | (wt %) | 28.5 | 28.7 | 28.3 |
| | Ec | (wt %) | 54.5 | 65.7 | 63.8 |
| Rx1 | Reactor Temperature | (° C.) | 72 | 72 | 72 |
| | Residence Time | (hr) | 1.6 | 1.78 | 1.88 |
| | $C_3$ Partial Pressure | (psi) | 305 | 276 | 276 |
| | $C_2$ Partial Pressure | (psi) | 0 | 0 | 0 |
| | $H_2/C_3$ Molar Ratio | — | 0.02 | 0.029 | 0.009 |
| | Alkyl Type | | TEAl | TEAl | TEAl |
| | SCA Type | — | SHAC ™ Catalyst ADT 5500-N Donor | SHAC ™ Catalyst ADT 5500-N Donor | SHAC ™ Catalyst ADT 5500-N Donor |
| | Calc. Al/SCA Molar Ratio | — | 2.6 | 2.50 | 2.52 |
| | Calc. SCA/Ti Molar Ratio | — | 18.8 | 19.7 | 19.8 |
| Rx2 | Reactor Temperature | (° C.) | 70 | 70 | 70 |
| | Residence Time | (hr) | 1.8 | 1.764 | 1.88 |
| | $C_2$ Partial Pressure | (psi) | 51.8 | 49.95 | 30.06 |
| | $C_3$ Partial Pressure | (psi) | 114.4 | 64.69 | 39.35 |
| | $H_2/C_3$ Molar Ratio | — | 0.522 | 0.535 | 0.8516 |
| | Alkyl Type | | | | |
| | SCA Type | — | NPTMS | NPTMS | NPTMS |
| | $SCA_2/SCA_1$ Molar Ratio | — | 0.12 | 0.166 | 0.172 |

™ indicates a trademark of The Dow Chemical Company

Examples 9-15 were generated in a multi-reactor system comprising liquid and gas phase particle forming reactors. A typical multi-reactor system to make the impact copolymers of the present disclosure may be described as follows:

The reactor system used to generate impact copolymer (ICP) is comprised of two liquid phase loop reactors and two fluidized bed reactors (total of four reactors) linked in series.

Polypropylene homopolymer was continuously produced (at 70° C.) in a first stage polymerization using two loop reactors and a catalyst system (catalyst, co-catalyst and external donor) that provides relatively high isotacticity, followed by production of ethylene/propylene copolymer in a second stage using two gas phase reactors in series. The homopolymer from the first stage was continuously transferred to the second stage gas phase reactor(s) where the ethylene/propylene copolymer was produced. In the first stage, the propylene monomer was fed into the loop reactors at a rate of 80 kg/h while maintaining 700 ppm $H_2$ and a density of 560 g/L. Either the same or different conditions were employed in the two gas phase reactors of the second stage to make either one or two types of ethylene/propylene copolymers. These ethylene/propylene copolymers can vary in ethylene and propylene composition as well as in molecular weight. To produce the ethylene/propylene copolymer, both ethylene and propylene as well as hydrogen (at 0.03 mol % gas phase ratio ($C_2/C_2+C_3$) and 0.015 mol % $H_2$) were fed to the gas phase reactor in the presence of a catalyst system and the propylene homopolymer. The characteristics of the in situ polymer blends produced in the continuous reactor system are given in the Table 2.

Polymer Analyses

Examples 4-11 are comparative examples and Examples 12-15 correspond to examples according to various embodiments of the present disclosure.

Example 4 corresponds to a conventional propylene impact copolymer having a dispersed phase comprising Fc1 of 55 wt % of propylene and 45 wt % of ethylene. The polymer is opaque, so blooming is not measurable or relevant. The polymer of Example 4 has a Gardner impact value of >200 in-lbs, indicating a high impact copolymer.

Examples 5-8 correspond to comparative propylene copolymers with a single "type 1 rubber" (Fc1) having low ethylene content (Ec1=62 wt %). The comparative polymers have a $\beta/\alpha<1$, so they are clear, showing high clarity and low haze. These comparative examples show that decreasing the type 1 rubber content (Fc1) decreases blooming but also decreases the observed Gardner impact value (−40° C.).

Examples 9-11 correspond to comparative propylene copolymers having a single "type 2 rubber" (Fc2) having high ethylene content (Ec2=90 wt %). In this series, the rubber has the same refractive index as the matrix, so they display high Melt flow rate of the matrix (MFR1) and ICP (MFR2) were measured in accordance with ASTM D1238-01 test method at 230° C. with a 2.16 kg weight for propylene-based polymers.

Blooming was determined by the increase in 20 mil plaque haze following aging at 50° C. in a Forced Draft Oven ("FDO") for 7 days.

Xylene Solubles of the matrix (XSR1) can be measured according to the following procedure. 0.4 g of polymer is dissolved in 20 mL of xylenes with stirring at 130° C. for 30 minutes. The solution can then be cooled to 25° C. and after 30 minutes the insoluble polymer fraction is filtered off. The resulting filtrate can be analyzed by Flow Injection Polymer Analysis using a Viscotek ViscoGEL H-100-3078 column with THF mobile phase flowing at 1.0 mL/min. The column is coupled to a Viscotek Model 302 Triple Detector Array, with light scattering, viscometer and refractometer detectors operating at 45° C. Instrument calibration was maintained with Viscotek PolyCAL™ polystyrene standards.

The $\beta/\alpha$ ratio was calculated via Fc, MFR1 and MFR2 according to the formula $$\beta/\alpha=[(MFR_1/MFR_2)^{0.213}-1]/(Fc/100)+1.$$

The physical/optical properties of Inventive and Comparative resins were determined as indicated above. The results of the resin analyses and resin physical/optical property measurements are given in Table 2.

TABLE 2

| Ex. | Type | MFR (dg/min) | Fc Tot. | Fc1 | Ec1 | Fc2 | Ec2 | $\beta/\alpha$ | Clarity | Haze | Bloom | −40° C. Impact (in-lbs) |
|---|---|---|---|---|---|---|---|---|---|---|---|---|
| Ex. 4 | Comparative | 20 | 30 | 30 | 45 | — | — | >1 | <5 | >90 | n/a (opaque) | >200 |
| Ex. 5 | Comparative | 25 | 30 | 30 | 62 | — | — | <1 | >95 | <25 | 26 | 190 |
| Ex. 6 | Comparative | 25 | 25 | 25 | 62 | — | — | <1 | >95 | <25 | 12 | 90 |
| Ex. 7 | Comparative | 25 | 20 | 20 | 62 | — | — | <2 | >95 | <25 | 8 | <8 |
| Ex. 8 | Comparative | 25 | 15 | 15 | 62 | — | — | <1 | >95 | <25 | 3 | <8 |
| Ex. 9 | Comparative | 20 | 30 | — | — | 30 | 90 | <1 | >95 | <25 | 0 | <50 |
| Ex. 10 | Comparative | 20 | 20 | — | — | 20 | 90 | <1 | >95 | <25 | 0 | <50 |
| Ex. 11 | Comparative | 20 | 10 | — | — | 10 | 90 | <1 | >95 | <25 | 0 | <50 |
| Ex. 12 | Inventive | 20 | 30 | 15 | 62 | 15 | 90 | <1 | >95 | <25 | 1 | >200 |
| Ex. 13 | Inventive | 20 | 30 | 20 | 62 | 10 | 90 | <1 | >95 | <25 | 3 | >200 |
| Ex. 14 | Inventive | 50 | 30 | 20 | 70 | 10 | 90 | <1 | >95 | <25 | <5 | 120 |
| Ex. 15 | Inventive | 50 | 39 | 26 | 62 | 13 | 96 | <1 | >95 | <25 | 3 | >200 |

Fc: Weight percent of dispersed phase
Fc1: Weight percent of type 1 dispersed phase
Ec1: Weight percent of dispersed phase
Fc2: Weight percent of type 2 dispersed phase
Ec2: Weight percent of dispersed phase clarity, low haze and low blooming. These comparative examples show that changes in the content of type 2 rubber in the formulation provides no benefit to impact resistance at −40° C. (all Gardner impact values less than 50 in-lbs). It is believed that this may be due to the polymer in the dispersed phase having a glass transition that is greater than the −40° C. testing temperature.

Examples 12-15 correspond to propylene impact copolymers according to various embodiments described herein, having both type 1 rubber (low ethylene content) and type 2 rubber (high ethylene content) in the dispersed phase. The polymers of these examples display high clarity, low haze and low blooming. In addition, the polymers display unexpectedly high Gardner impact values (at −40° C.).

Rubber content (Fc Total, Fc1 and Fc2), ethylene content of the rubber (Ec1 and Ec2) and ethylene content of matrix (Em) were determined by FTIR.

Although the invention has been described in considerable detail through the preceding description and examples, this detail is for the purpose of illustration and is not to be construed as a limitation on the scope of the invention as it is described in the appended claims. It should be understood that it is expressly contemplated that various features of the ICP polymer compositions, including those recited in the following claims may be combined in any order, unless such combination would result in a claimed structure containing incompatible recitations. All United States patents, published patent applications, allowed patent applications and references identified above are incorporated herein by reference.

What is claimed is:

1. A composition comprising:
a matrix phase comprising 50 to 95 weight % of a polypropylene polymer comprising from 0 to 6 mole % of units derived from one or more alpha-olefins selected from the group consisting of ethylene, 1-butene, 1-pentene, 1-hexene, 1-heptene, 1-octene, 1-nonene, 1-decene, 1-undecene and 1-dodecene; and a dispersed copolymer phase comprising from 5 to 50 weight % of the total composition, the dispersed copolymer phase comprising:

from 40 to 90 weight % of a first copolymer comprising 35 to 85 weight % of ethylene and 15 to 65 weight % of a first rubber comonomer comprising one or more $C_3$-$C_{12}$ α-olefin, and from 10 to 60 weight % of a second copolymer comprising 65 to 95 weight % of ethylene and 5 to 35 weight % of a second rubber comonomer comprising one or more $C_3$-$C_{12}$ α-olefin, wherein the weight percent of ethylene in the second copolymer is greater than the weight percent of ethylene in the first copolymer.

2. The composition of claim 1, wherein the composition has a beta/alpha ratio of less than or equal to about 1.1.

3. The composition of claim 1, wherein the first copolymer and the second copolymer contain amounts of ethylene such that the composition is non-blooming.

4. The composition of claim 3, wherein the composition has a haze value less than about 25% on a 20 mil plaque as measured in accordance with ASTM D 1003.

5. The composition of claim 3, wherein the composition has a clarity value greater than about 95% on a 20 mil plaque as measured in accordance with ASTM D 1003.

6. The composition of claim 1, wherein the composition has a Gardner impact value greater than about 100 in-lbs at −40° C.

7. The composition of claim 1, wherein at least one of the first rubber comonomer and the second rubber comonomer is propylene.

8. A fabricated article comprising:
a propylene impact copolymer composition comprising:
a matrix phase comprising 50 to 95 weight % of a polypropylene polymer comprising from 0 to 6 mole % of units derived from one or more alpha-olefins selected from the group consisting of ethylene, 1-butene, 1-pentene, 1-hexene, 1-heptene, 1-octene, 1-nonene, 1-decene, 1-undecene and 1-dodecene; and a dispersed copolymer phase comprising from 5 to 50 weight % of the total composition, the dispersed copolymer phase comprising:

from 40 to 90 weight % of a first copolymer comprising 35 to 85 weight % of ethylene and 15 to 65 weight % of a first rubber comonomer comprising one or more $C_3$-$C_{12}$ α-olefin, and from 10 to 60 weight % of a second copolymer comprising 65 to 95 weight % of ethylene and 5 to 35 weight % of a second rubber comonomer comprising one or more $C_3$-$C_{12}$ α-olefin, wherein the weight percent of ethylene in the second copolymer is greater than the weight percent of ethylene in the first copolymer.

9. The fabricated article of claim 8, wherein the propylene impact copolymer composition has a beta/alpha ratio of less than or equal to about 1.1.

10. The fabricated article of claim 8, wherein the first copolymer and the second copolymer contain amounts of ethylene such that the composition is non-blooming.

11. The fabricated article of claim 10, wherein the propylene impact copolymer composition in the fabricated article has a haze value less than about 25% on a 20 mil plaque as measured in accordance with ASTM D1003.

12. The fabricated article of claim 10, wherein the propylene impact copolymer composition in the fabricated article has a clarity value greater than about 95% on a 20 mil plaque as measured in accordance with ASTM D1003.

13. The fabricated article of claim 8, wherein the propylene impact copolymer composition in the fabricated article has a Gardner impact value greater than about 100 in-lbs at −40° C. as measured in accordance with ASTM D5420-10 GE configuration.

14. The fabricated article of claim 8, wherein the propylene impact copolymer composition in the fabricated article has a flexural modulus/stiffness value of greater than 110 kpsi as measured in accordance with ASTM D790 at 1% secant.

15. The fabricated article of claim 8, wherein at least one of the first rubber comonomer and the second rubber comonomer is propylene.

16. The fabricated article of claim 8, wherein the fabricated article is selected from the group consisting of a thermoformed article, an injection molded article, a thin walled injection molded article, a flat plaque, and a blow molded article.

17. The composition of claim 1, wherein the dispersed copolymer phase comprises:

from 40 to 90 weight % of a first copolymer comprising 60 to 65 weight % of ethylene and 35 to 40 weight % of a first rubber comonomer comprising one or more $C_3$-$C_{12}$ α-olefin, and from 10 to 60 weight % of a second copolymer comprising 85 to 95 weight % of ethylene and 5 to 15 weight % of a second rubber comonomer comprising one or more $C_3$-$C_{12}$ α-olefin.

18. The fabricated article of claim 8, wherein the dispersed copolymer phase comprises:

from 40 to 90 weight % of a first copolymer comprising 60 to 65 weight % of ethylene and 35 to 40 weight % of a first rubber comonomer comprising one or more $C_3$-$C_{12}$ α-olefin, and from 10 to 60 weight % of a second copolymer comprising 85 to 95 weight % of ethylene and 5 to 15 weight % of a second rubber comonomer comprising one or more $C_3$-$C_{12}$ α-olefin.

* * * * *